Patented Apr. 7, 1936

2,036,825

UNITED STATES PATENT OFFICE 2,036,825

MOLDED ELECTRICAL INSULATING PARTS

William Edward Pattman, Olton, England, assignor to Bakelite Limited, London, England, a British company No Drawing. Application March 25, 1931, Serial No. 525,346. In Great Britain March 27, 1930

4 Claims. (Cl. 173—28)

This invention is for improvements in or relating to molded electrical insulation parts and in particular to those articles such as switchgear, fuse components, magneto distributors, etc. the surfaces of which are subject to the influence of arcs caused by the breaking of electrical circuits.

Before the introduction of thermo-setting plastic materials into the electrical industry, it was customary for many insulating parts to be constructed of porcelain. Porcelain has now been largely replaced by plastic compositions comprising fibrous materials such as woodmeal, paper pulp, etc. impregnated with phenol formaldehyde condensation products. These compositions are characterized by the property of conversion from the soluble and fusible condition to the insoluble and infusible state by the application of heat. Compared with porcelain products the synthetic resinous materials possess the following advantages:—

1. Facility of manufacture.
2. Improved appearance.
3. Increased resistance to shock.
4. Capable of being made into more intricate shapes.

Unfortunately, these materials are subject to the big disadvantage of their poor resistance to the carbonizing effect of the electric arc and they cannot be used with satisfaction in those cases where there is a possibility of surface sparking. Surface sparking produces charring followed by the formation of a conducting path along the charred track. This phenomenon is referred to as "tracking".

It is an object of the invention to manufacture thermo-setting compositions such that articles molded from them under the combined effect of heat and pressure retain the advantages enumerated above and possess in addition increased resistance to the carbonizing effect of the electric arc.

According to the invention molded electrical insulating parts are composed of a material which at the surface thereof comprises an amino plastic.

Preferably the said parts are prepared from a thermo-setting molding mixture comprising an amino plastic as binder. Alternatively, the bulk of the molded article may consist of other thermo-setting materials and a thermo-setting material comprising an amino plastic may form the surface layer thereof.

Conveniently according to the invention the amino plastic may comprise an urea-formaldehyde resin.

The resinous materials may be produced by condensing a urea with formaldehyde or by condensing mixtures of urea and phenol with formaldehyde. Thiourea may be used instead of urea or derivatives of both urea and thiourea may be used and similarly phenol derivatives or homologues may be substituted for phenol. The formaldehyde employed may be either in the form of aqueous solution or in the anhydrous polymeric form such as paraformaldehyde or trioxymethylene. Suitable fillers are woodmeal, paper pulp, asbestos, cotton flock, and kindred materials and mineral fillers such as mica and pigments may also be incorporated. The fillers may also be in sheet form in which case impregnation is best effected with a resin in the liquid stage or with a solution of the resinous material in a solvent.

Resistance to "tracking" is still further increased if non-carbonaceous fillers such as asbestos or mica or mixtures thereof are employed.

These moldable compositions made by already well known means are then consolidated by heat and pressure. The molding process may be carried out in a closed mold such that articles are obtained of the correct dimensions and shape for immediate application. The compositions best suited for this process are those made by impregnating disintegrated fillers, such as meals, flocks or pulps etc. By a second process the articles can be cut from sheet material which has been made by consolidating stocks of superimposed impregnated sheets, or by an analogous process wherein the impregnated sheets are would round mandrels into tube formation and molded.

The following example is given to illustrate a typical method by which the invention may be carried into practice, but the invention is not to be considered as limited in any way by the materials or quantities mentioned.

Example 1

The following reaction mixture is boiled for one hour under reflux condenser:—

| | Parts by weight |
|---|---|
| Phenol | 180 |
| Urea | 240 |
| Aqueous formaldehyde (40% solution) | 650 |

The condensation product is then concentrated preferably under vacuum. Distillation is continued until a sample of the product on cooling is brittle. The cold resin is ground and ball milled with an equal weight of woodmeal. Accelerators, plasticizers, colouring agents and lubricants may also be added. The mixture is sheeted between heated calenders and ground when cold and finally the composition is molded to the requisite shape under the combined action of heat and pressure.

I claim:—

1. In an electrical apparatus including an electrical circuit, means for breaking the circuit and an electrical insulation for said means whose surface is subject to the carbonizing effect of arcing caused by the breaking of the circuit, said insulation surface comprising a composition molded under the action of heat and pressure from a thermo-setting composition having as a binder an amino plastic for a fibrous filler selected from the group of wood meal, paper pulp, asbestos, cotton flock and characterized by resistance to arcing.

2. In an electrical apparatus including an electrical circuit, means for breaking the circuit and an electrical insulation for said means whose surface is subject to the carbonizing effect of arcing caused by the breaking of the circuit, said insulation surface comprising a composition molded under the action of heat and pressure from a thermo-setting composition having as a binder a urea-aldehyde for a fibrous filler selected from the group of wood meal, paper pulp, asbestos, cotton flock and characterized by resistance to arcing.

3. In an electrical apparatus including an electrical circuit, means for breaking the circuit and an electrical insulation for said means whose surface is subject to the carbonizing effect of arcing caused by the breaking of the circuit, said insulation surface comprising a composition molded under the action of heat and pressure from a thermo-setting composition having as a binder a phenol-urea-aldehyde for a fibrous filler selected from the group of wood meal, paper pulp, asbestos, cotton flock and characterized by resistance to arcing.

4. In an electrical apparatus including an electrical circuit, means for breaking the circuit and an electrical insulation for said means whose surface is subject to the carbonizing effect of arcing caused by the breaking of the circuit, said insulation surface comprising a composition molded under the action of heat and pressure from a thermo-setting composition having as a binder an amino plastic for a fibrous filler selected from the group of wood meal, paper pulp, asbestos, cotton flock, said composition including a mineral filler and characterized by resistance to arcing.

WILLIAM EDWARD PATTMAN.